(12) United States Patent
Vincent et al.

(10) Patent No.: US 10,149,790 B2
(45) Date of Patent: Dec. 11, 2018

(54) EVACU ZIP AND CARRY STRAP WITH CLAMP

(71) Applicants: Patrick D. Vincent, St. Louis, MO (US); Shandra Y. McNeese, Belleville, IL (US)

(72) Inventors: Patrick D. Vincent, St. Louis, MO (US); Shandra Y. McNeese, Belleville, IL (US)

( * ) Notice: Subject to any disclaimer, the term of this patent is extended or adjusted under 35 U.S.C. 154(b) by 303 days.

(21) Appl. No.: 15/023,325

(22) PCT Filed: Sep. 18, 2014

(86) PCT No.: PCT/US2014/056362
§ 371 (c)(1),
(2) Date: Mar. 18, 2016

(87) PCT Pub. No.: WO2015/042293
PCT Pub. Date: Mar. 26, 2015

(65) Prior Publication Data
US 2016/0220429 A1    Aug. 4, 2016

Related U.S. Application Data

(60) Provisional application No. 61/879,564, filed on Sep. 18, 2013.

(51) Int. Cl.
| | |
|---|---|
| *A61G 1/048* | (2006.01) |
| *A61G 1/044* | (2006.01) |
| *A61G 7/05* | (2006.01) |
| *A61G 7/10* | (2006.01) |
| *A61G 1/01* | (2006.01) |
| *F16B 2/00* | (2006.01) |
| *F16B 2/06* | (2006.01) |

(52) U.S. Cl.
CPC ............... *A61G 1/048* (2013.01); *A61G 1/01* (2013.01); *A61G 1/044* (2013.01); *A61G 7/0504* (2013.01); *A61G 7/1078* (2013.01); *F16B 2/005* (2013.01); *F16B 2/06* (2013.01)

(58) Field of Classification Search
CPC ... B25G 3/00; B25G 3/12; B25G 3/14; B25G 3/20; B25G 3/24; A61G 1/048
USPC ................ 5/425, 81.1 T, 81.1 HS, 426, 427; 16/422, 110.1, 411, 430, 436
See application file for complete search history.

(56) References Cited

U.S. PATENT DOCUMENTS 5,579,546 A * 12/1996 Griskauskas ........ A61G 7/1023
5/627

* cited by examiner

*Primary Examiner* — Fredrick C Conley
(74) *Attorney, Agent, or Firm* — Charles McCloskey

(57) ABSTRACT

An Evacu Zip and Carry Strap with Clamp device has a body generally rectangular in shape with a chest merging to a neck that widens to a shoulder. From the shoulder, a cover and a spaced below lower jaw extend opposite the neck. Beneath the cover, an upper jaw pivots upon a pin to mutually engage teeth with teeth upon the lower jaw. A knob joined to a shaft advances a rod to move the upper jaw from an open position to a closed position. In the closed position, the device grips a pillowtop or other material for rapid conversion of it into a stretcher for evacuation. The knob to turns towards counterclockwise for closing the upper jaw to the lower jaw. The invention also includes a strap extending from the chest. An alternate embodiment includes lighting directed towards the two jaws.

19 Claims, 6 Drawing Sheets

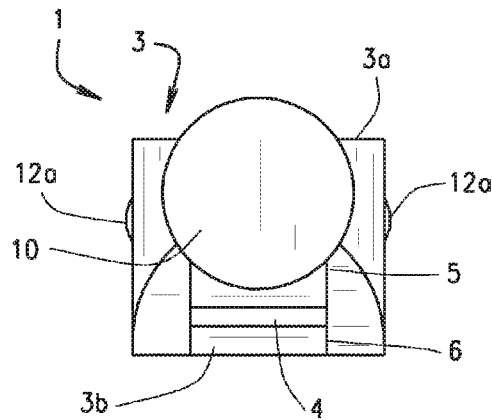
FIG. 7
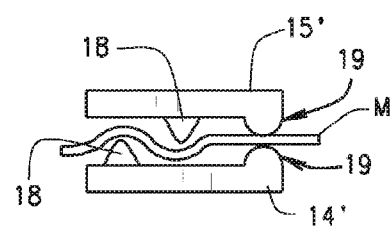
FIG. 8A
FIG. 8B
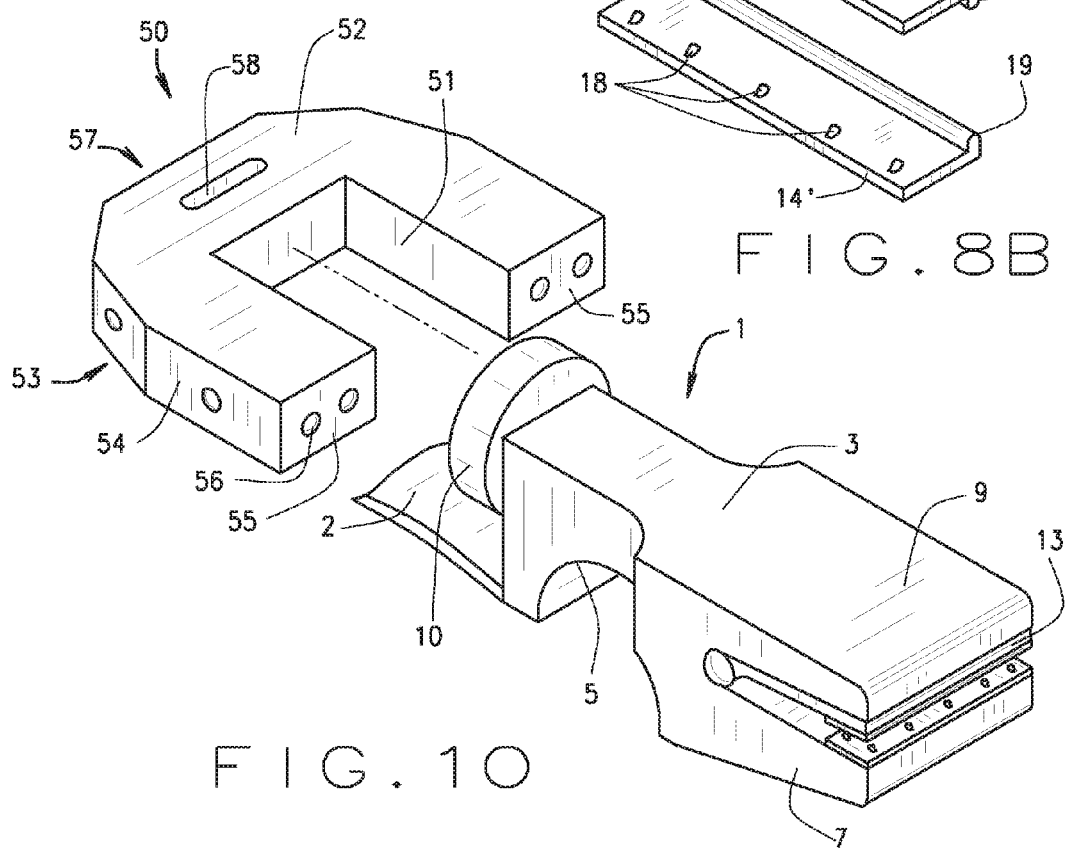
FIG. 10

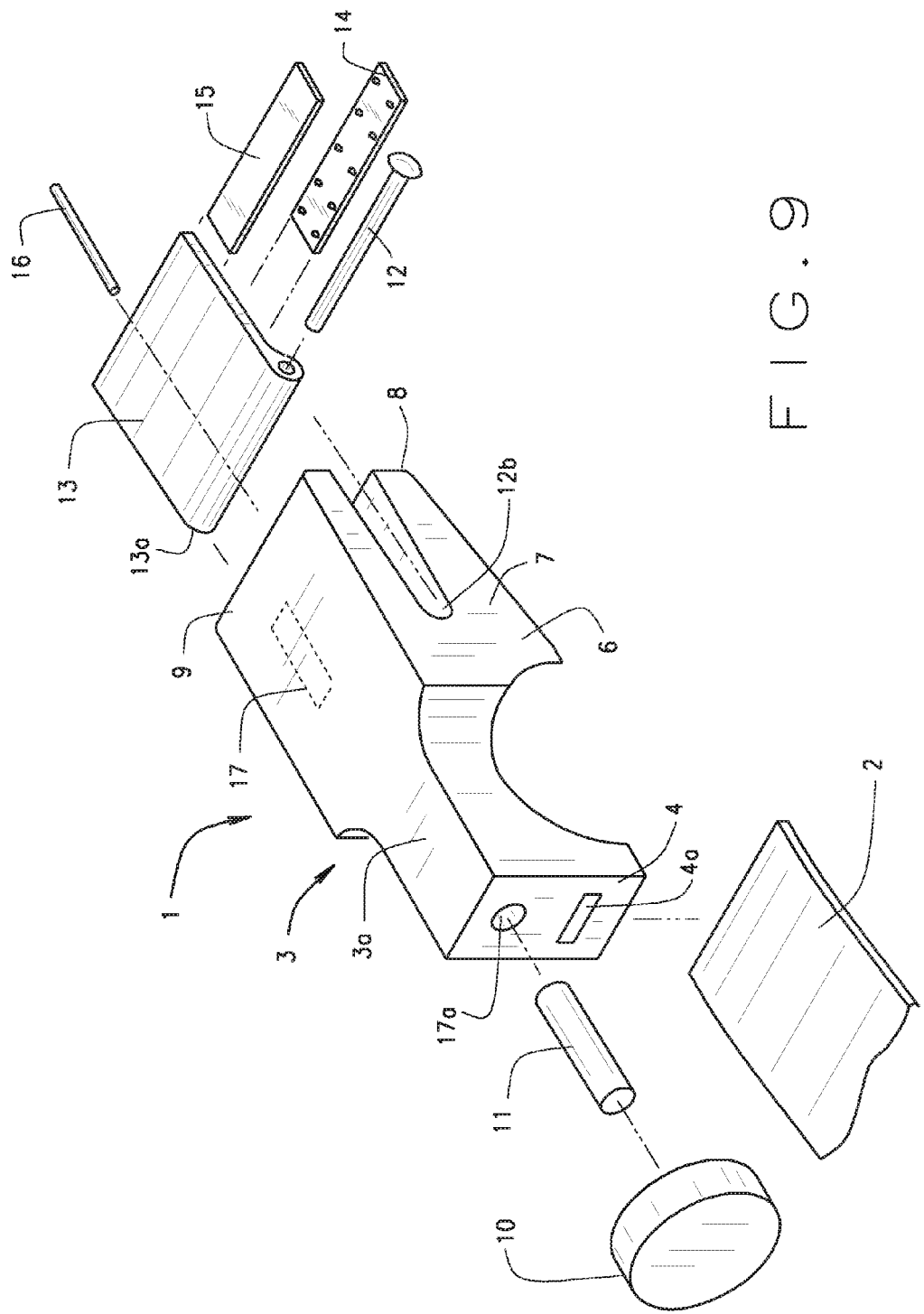

EVACU ZIP AND CARRY STRAP WITH CLAMP

CROSS-REFERENCE TO RELATED APPLICATION

This non-provisional application under the Patent Cooperation Treaty (PCT) claims priority to the provisional application 61/879,564 filed on Sep. 18, 2013 and which has one common inventor.

TECHNICAL FIELD

Background of the Invention

The Evacu Zip and Carry Strap with Clamp device generally relates to litters and stretchers and more specifically to a clamp that grasps a pillowtop converting it into a stretcher for a patient.

For millennia, people have carried their ill, their wounded, and their dead. Early on, people carried others by hauling them over their shoulders. In time, litters of various forms and purposes developed. In modern times, stretchers, gurneys, Stokes litters, and the like have appeared on the scene to transport persons by others. Typically a stretcher has one person lying upon it in a recumbent position and two other persons carry the stretcher from its ends.

A stretcher can begin simply as a blanket, sheet, tarp, or other flexible, sheet material. Persons then fold the edges of the blanket over two poles and have the edges towards the center of the stretcher. A patient then is placed upon the edges of the blanket so that the patient's weight generates frictional engagement of the blanket. The friction prevents the blanket edges from separating, under most conditions. Two other persons then grasp the poles and carry the stretcher away. From that humble beginning, stretchers have various manufactured forms that often have a canvas construction upon wooden poles. The wooden poles have feet and hinged spanners between them. The wooden poles collapse the canvas into a compact though still elongated form. Stretchers see use with fire departments, police departments, other first responders, military units, and other groups where injury may occur and transport of the injured appears necessary.

However, people don't receive injuries every moment and stretchers may remain dormant and rarely used. People who do receive an injury, make their way to medical care, often a hospital. People may use an ambulance, other hired vehicle, drive themselves, or have others drive them to a hospital. A hospital then provides a gurney or other equipment to transport a patient in and around a hospital. Though hospital is mentioned, other medical facilities are also implied in the term. Though the term stretcher is mentioned in this application, it implies the terms gurney, litter and the like.

Hospitals though remain a part of the environment. The environment, from time to time, sends a difficult situation towards a hospital. Those situations include tornados, hurricanes, floods, power failures, internet outages, gas leaks, civil disturbances, and worse. A recent tornado in Joplin, Mo. applied a direct hit to a hospital. Hospital staff and others acted quickly and evacuated the patients from the hospital before the tornado arrived. The tornado blew out all windows to the hospital and caused other damage, rendering the hospital inoperative for over three days following a disaster. That hospital was part of the disaster for the town.

The evacuation though strained hospital resources. Ambulatory patients departed the hospital with the least assistance from staff. However, unconscious and other patients in severe conditions consumed staff attention as entire hospital beds were evacuated. Such bed evacuations consumed much elevator resources. In acute situations, staff carried patients as best they could down stairs.

Responding to the Joplin tornado and other events, the Joint Commission issued a standard regarding evacuation of patients from a hospital or other medical facility. Hospital operators now seek to comply with the standard.

Description of the Prior Art

From the simple stretchers described above to wheeled, powered, and automated gurneys, hospitals have various patient transports available for evacuation. However, wheeled gurneys call for elevators and ramps during evacuation of them out of a hospital building.

Presently, hospitals and other patient care facilities have a current, complicated process of rapid evacuation of bedridden and other hospitalized persons that have a disability, handicap, or other condition that renders them non-ambulatory. The prior art current practice to evacuate patients has a lack of time and of notification for pending disasters, a lack of education and proper use of products, and lack of immediate access and appropriate storage of prior art stretchers. The prior art suffers from a lack of training of staff on its proper use compounded by lack of access to it in time of acute need, such as an impending disaster.

An existing system of evacuation has the trade name of MedSled® of ARC Products LLC, from Des Peres, Mo. This evacuation system utilizes a sheet of polymer material placed beneath a patient. The sheet is the rolled partially around the sides of the patient along the length of the patient. The users then apply straps from one edge of the sheet over the patient to the opposite edge. The users can adjust the straps for patient comfort. The users then lift the patient from a bed to a floor and drag the patient from the hospital room to safety.

The present invention overcomes the disadvantages of the prior art and provides an Evacu Zip and Carry Strap with Clamp device for gripping pillowtops. The device utilizes a clamp with comfortable user grip, counterclockwise advancing knob, and two wide trays of teeth for grasping an existing pillowtop and converting it into a stretcher. The device through its construction avoids tearing of the pillowtop and promotes manual carrying for a long distance and time.

SUMMARY OF THE INVENTION

Generally, the Evacu Zip and Carry Strap with Clamp device has a body generally rectangular in shape with a chest merging to a neck that widens to a shoulder. From the shoulder a cover and a spaced below lower jaw extend opposite the neck. Beneath the cover, an upper jaw pivots upon a pin to mutually engage teeth with teeth upon the lower jaw. A knob joined to a shaft advances a rod to move the upper jaw from an open position to a closed position. In the closed position, the device grips a pillowtop or other material for rapid conversion of it into a stretcher for evacuation. The knob turns towards the left for closing the upper jaw to the lower jaw. The invention also includes a strap extending from the chest. An alternate embodiment of the invention includes lighting directed towards the two jaws.

The present invention allows the immediate use of an existing component of a hospital bed typically its pillowtop. The present invention provides for vertical evacuation, horizontal evacuation, and other non-traditional patient movement methods. The present invention rapidly transfers and evacuates disable, handicapped, bed-ridden and other non-ambulatory patients in times of disaster or other facility compromise.

The present invention includes a method of its use where a user unzips a pillowtop mattress from the main mattress of a hospital bed. The user then opens the invention and positions it upon the zipper teeth of the pillowtop and clamps it in place. This clamping positions the modified carrying straps to the pillowtop mattress. The modified carrying straps have an adjustable length to accommodate the height of any user and the stairwell decline during a vertical evacuation. The method of the invention has two steps: first an unzipping process of an existing hospital mattress, and second reattaching the modified carrying straps using the clamping of the invention.

The present invention integrates an existing industrial strength mattress zipper from a width and weight perspective that cooperates in a similar relationship with the modified carrying strap.

The application of straps to a pillowtop mattress determines the number of uses necessary to transfer or move a patient. The straps permit manufacturing and arranging into a harness form suitable to perform horizontal transfers of a patient by one user.

There has thus been outlined, rather broadly, the more important features of the invention in order that the detailed description thereof that follows may be better understood and that the present contribution to the art may be better appreciated. The present invention also includes teeth made into replaceable trays, trays with lips and teeth, a thinning of the depth of the neck, swiveling of the light housing, a knob turning to the left, and a method for deploying the invention. Additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide an Evacu Zip and Carry Strap with Clamp that grips a pillowtop of an existing hospital bed and supports the weight of a patient without tearing the pillowtop.

Another object is to provide such an Evacu Zip and Carry Strap with Clamp that eliminates storage and access vulnerabilities.

Another object is to provide such an Evacu Zip and Carry Strap with Clamp that greatly simplifies training of persons for its use.

Another object is to provide such an Evacu Zip and Carry Strap with Clamp that installs upon a pillowtop or other flexible sheet within a hospital room with semi-skilled or unskilled labor.

Another object is to provide such an Evacu Zip and Carry Strap with Clamp that eliminates searching, storing, and patient packing process used by the prior art.

Another object is to provide such an Evacu Zip and Carry Strap with Clamp that causes a user to pause before engaging the clamp for use.

Another object is to provide such an Evacu Zip and Carry Strap with Clamp that illuminates the area ahead of the Clamp of the invention.

Another object is to provide such an Evacu Zip and Carry Strap with Clamp that has a low cost of manufacturing so the purchasing hospitals, clinics, supply managers, purchasing agents, physicians, staff members, government agencies, business establishments, and organizations can readily buy the Clamp of the invention through supply houses and contracting channels.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings,
FIG. 7 is a back view of the invention;
FIG. 8a is a side detailed view of an alternate embodiment of teeth trays;
FIG. 8b is a perspective detailed view of the alternate embodiment of teeth trays;
FIG. 9 is an exploded view of the invention;
FIG. 10 is a perspective view of the light housing alternate embodiment.

The same reference numerals refer to the same parts throughout the various figures.

DESCRIPTION OF THE PREFERRED EMBODIMENT

Figure 1:
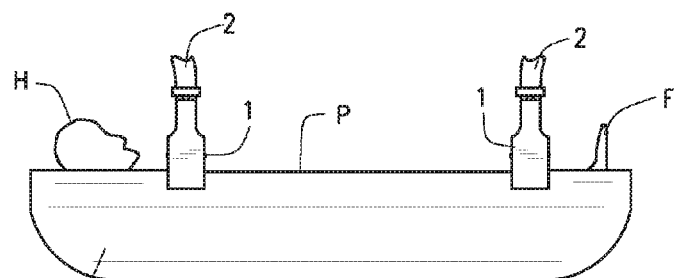
FIG. 1 is a side view of the invention deployed for patient evacuation.

The present invention overcomes the prior art limitations by providing an Evacu Zip and Carry Strap with Clamp. The present invention sees its use during an evacuation of a patient P as shown in FIG. 1. The patient lies in a recumbent position with a stretcher S formed from the pillowtop of a hospital mattress. The pillowtop has at least two of the invention as at 1 gripping along the perimeter of the pillowtop. Hospital staff may position the invention 1 at locations convenient to the staff and comfortable to the patient, typically proximate the patient's shoulders, that is forward of the patient's head H and in the vicinity of the patient's feet F. Each of the invention provides a strap 2 suitable for gripping by staff. Though this figure shows two of the invention, a matching pair is suggested for the other side of the pillowtop and for a stable lift of the patient. Though this figure has a recumbent patient for horizontal transfer, the invention provides for grip and closure of a pillowtop around a patient as during vertical transfer, such as down stairs or by ropes.

Figure 2:
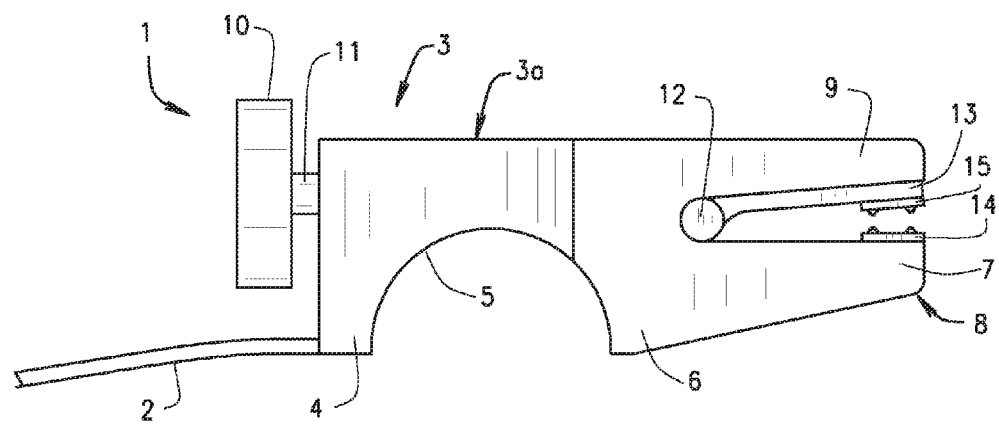
FIG. 2 is a side view of the invention in an open position.

The invention has its side view in FIG. 2 and in an open position, that is, before gripping of a pillowtop from a hospital mattress. The invention 1 has a generally rectangular body 3 of compact form suitable for grasping by a user's hand, that is a staffer's hand. The body has a handle like portion that begins with a chest 4 shown towards the left of the figure that narrows into the plane of the figure forwardly and that narrows upwardly on the figure into a neck 5. The neck has a generally arcuate form and a thickness less than the depth of the chest. The thickness of the neck denotes the amount of material below the top of the invention. The neck has its greatest thickness near the chest and a shoulder 6, and its thinnest thickness generally centered between the chest and the shoulder. The body then widens from the neck outwardly and downwardly to the shoulder 6. The chest, neck, and shoulder cooperate and provide a manual gripping surface for a user. During emplacement of the invention 1, as jaws apart in the open position, the user curls his thumb and finger forefinger around the neck and advances the invention over the edge, zipper, and material of a pillowtop. Following clamping of the jaws upon is the pillowtop, a user may grip the neck comfortably to assist in carrying a patient a sizeable distance.

The shoulder has a similar depth as the chest. The shoulder then extends to the right of the figure with a lower jaw 7 that decreases its thickness slightly and has its least thickness at a chin 8 shown opposite form the chest. Above the lower jaw, the body has a cover 9 that extends to the right of the figure also while maintaining its constant thickness. The cover is generally coplanar with the remainder of the body as shown so that the body has a flat top surface as at 3*a*.

The chest has an aperture 4*b* that admits the strap 2 for securement. The strap enters the aperture then wraps around a bar, 4*a*, of the chest and then secures upon itself with stitching for a loop. Alternatively, a user may replace the strap with a belt, rope, and the like as an evacuation situation may require. In a further alternate embodiment, the strap 2 has a generally linear form with a buckle or other closure upon one end and an opposite free end. The free end inserts through the aperture 4*b* of one invention 1 then spans across, that is, transverse a patient, inserts through another aperture 4*b* of a second of the invention 1, and then returns to the buckle or closure. The strap in this alternate embodiment spans across a curled up pillowtop.

Above the chest and the neck, the body has a knob 10 fixed to a shaft 11 that extends into the body 3 forwardly towards the cover 9. The knob and the shaft rotated about an axis parallel to the length, that is, longitudinal axis of the body.

The shaft continues towards the cover 9 as shown to the right of the figure. Positioned beneath the cover and above the shoulder, the body has a pin 12 extending transverse the shoulder, that is perpendicular is to the shaft. The pin connects to an upper jaw 13 that extends outwardly to beneath the cover 9 and has a flush ending beneath the cover and above the chin. Above the chin 8, the lower jaw has a lower tray 14 generally outwardly from the pin 12. The lower tray has a gripping surface, such as teeth upon it. The lower tray engages the pillowtop during usage of the invention. Opposite the pin, the upper jaw 13 has an upper tray 15 with a gripping surface that cooperates with the lower tray. The upper tray aligns with the lower tray and here has a spacing above the lower tray thus denoting the open position. The upper tray and the lower tray have a generally thin rectangular shape with a length at least twice that of its width. The shape of the trays and the gripping surface cooperate to disperse the compressive forces from the clamp and the shear forces from the patient load applied to a contiguous portion of the pillowtop. The shape of the trays prevents tear our or other load failure of the pillowtop during usage.

Figure 3:
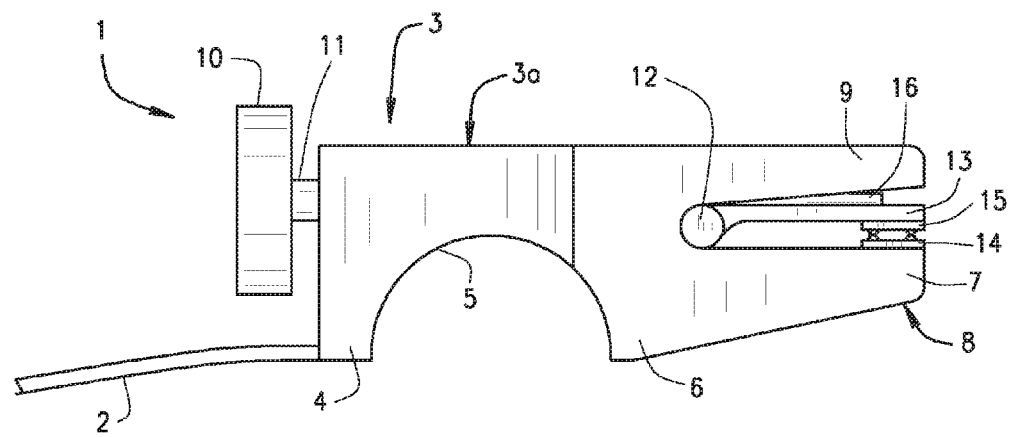
FIG. 3 is a side view of the invention in a closed position.

FIG. 3 shows that in time of need or for training, the invention 1 has a closed position for gripping the perimeter of the pillowtop, that is, the zipper region of the pillowtop. To engage the gripping of the invention 1, a user turns the knob 10 counterclockwise which is opposite the conventional right hand rule of threading. This opposite direction of engagement reminds the user to turn and secure the knob for gripping. In turning the knob, the shaft 11 advances forwardly towards the cover 9 and in doing so, depresses a rod 16 upon the upper jaw 13. As the rod depresses, that is, drops from the cover, the rod urges the upper jaw downwardly upon its pivot from the pin 12 so that the upper tray 15 mutually engages the lower tray 14. The two trays then clamp the perimeter of the pillowtop between them during usage as previously is shown in FIG. 1. The two trays mutually align as shown in the closed position of the invention 1.

Figure 4:
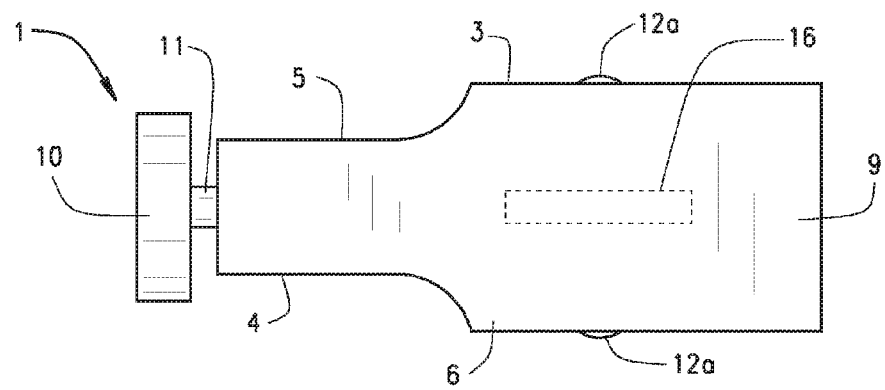
FIG. 4 is a top view.

FIG. 4 shows a top view of the invention 1 with the top surface 3*a* in the foreground. The body 3 has a spade like shape in this view with a narrow portion, or handle, proximate the knob 10 and the shaft 11 that then widens after the neck 5 towards the shoulder 6. The shoulder shows the pin 12 having its two ends 12*a* extending slightly outwardly from the body. Outwardly from the pin ends 12*a*, the cover 9 continues in a generally rectangular shape. Within the cover, shown in dotted line, the body has a chamber 17 that admits the rod 16 during the clamping of the upper tray upon the lower tray to attain the closed position.

Figure 5:
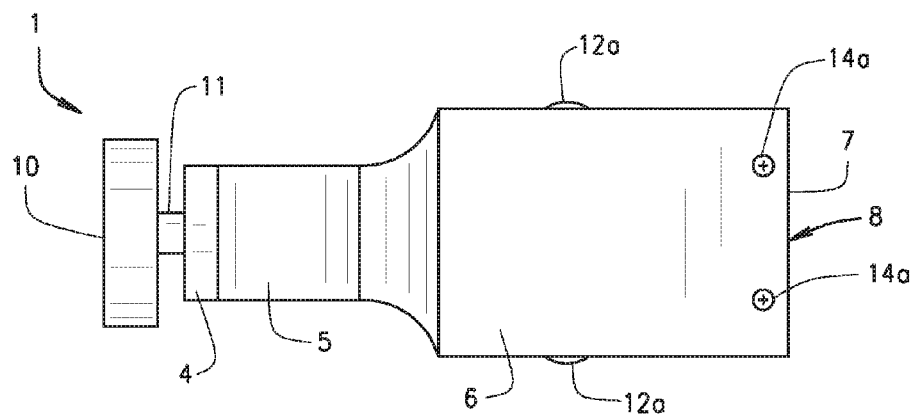
FIG. 5 is a bottom view.

Turning the invention 1 over, FIG. 5 shows the bottom view of the invention where this surface 3*b* of the invention typically aligns with a lower surface of the pillowtop. The knob 10 connects to the shaft 11 which enters the chest 4 and neck 5 as described and shown above. The neck 5 then widens the body 3 at the shoulder 6 and the lower jaw 7 then extends to the right. The lower jaw does not move relative to the rest of the body as it is the fixed jaw for the invention. The lower jaw extends towards its chin 8 that has two connectors 14*a* for the lower tray. The connectors include preferably screws but alternatively bolts, rivets, swaged pins, welds, and the like.

Figure 6A:
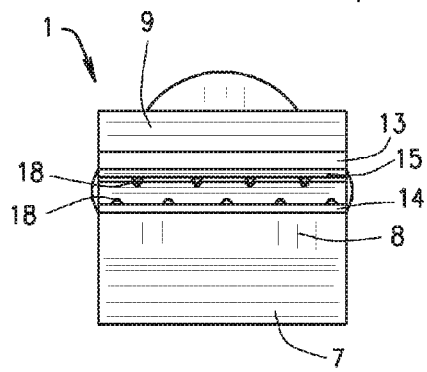
FIG. 6a is a front view of the invention in the open position.
Figure 6B:
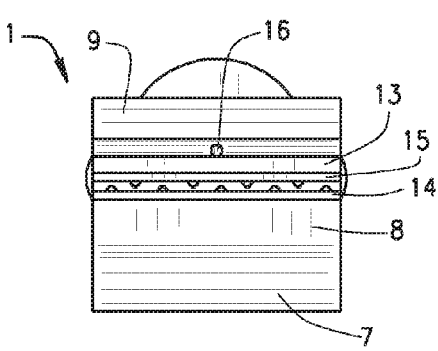
FIG. 6b is a front view of the invention in the closed position.

Having previously referred to an open position and a closed position, FIG. 6 shows front view of those two positions. FIG. 6*a* shows the invention 1 with the body 3 and the lower jaw 7 and the upper jaw 13 in an open positions, that is, the upper tray 15 is spaced above the lower tray 14. The two trays 14, 15 are shown having a plurality of teeth 18 thereon. The teeth 18 may have an irregular pattern or preferably two rows of is aligned separate, spaced apart, teeth. Outwardly from the teeth, the lower tray 14 connects to the lower jaw 7 proximate the chin 8 using the connectors 14a as previously shown. The upper tray 15 connects to the upper jaw 13 and the upper jaw abuts the rod 16. In the open position of the invention, the rod barely appears beneath the cover 9.

Upon a user turning the knob counterclockwise, the rod 16 advances downwardly, that is, inwardly from the cover 9. In doing so, the rod urges the upper jaw 13 downwardly towards the lower jaw 7 so that the upper tray 15 meets the lower tray 14. The invention 1 then grips a pillowtop or any other material placed between the two trays 14, 15 and their teeth 18. A user turns the knob furthest counterclockwise to embed the teeth into the pillowtop.

A user sees the knob 10 in the foreground of FIG. 7 a back view of the invention 1. The knob turns counterclockwise to close the jaws and clockwise to open them. The knob has a diameter that exceeds the width of the chest and a position so that the knob extends below a plane defined by the bottom surface 3b. The knob has a round shape and a sufficient diameter to encourage rapid during by a user during an evacuation or other crisis. Preferably the knob has a minimum diameter of 0.75 inches. In an alternative embodiment, the knob is replaced by a pin with a length of at least 0.75 inches. Inwardly from the knob, the body has its chest 4 that extends through its neck 5 towards the shoulder 6. The pin 12 has its ends 12a extending outwardly from the plane of the shoulder and the jaws 7, 13 remain concealed in the background of this view.

Though the preceding description has referred to teeth 18 in trays 14, 15, the grip feature of the invention may arise with alternative configurations of the trays. FIG. 8 shows from the side an alternate embodiment of the trays where FIG. 8a has the alternate trays 14', 15' in a closed position upon a material M. The lower tray 14' has a lip 19, generally rounded and denoting the outside of the tray, that is, the edge towards the material M or pillowtop. Spaced inwardly from the lip, the lower tray 14' has a plurality of teeth 18 as described before. The upper tray 15' though has a slightly different arrangement. The upper tray 15' also has a lip 19, rounded, that aligns with the lip in the lower tray 14'. Spaced inwardly from the lip and less so than the teeth in the lower tray, the upper tray 15' has its teeth 18. The teeth 18 of the upper tray 15' have a position generally between the lower tray's teeth and the upper tray's lip. This arrangement of the teeth 18 of the two trays 14', 15' pinches the material M at the lips 19 and then deflects the material inwardly from the lips for a secure grip of it. FIG. 8b shows the alternate trays in a perspective view with the lips 19 forwardly and the teeth 18 spaced inwardly from the lips 19, the teeth of the lower tray being further inwardly than those of the upper tray. The trays have a generally rectangular form and a thickness as shown. Alternatively, the trays in the preferred embodiment and in the alternate embodiment have a smooth, or chromed, finish outside of the teeth 18.

Then FIG. 9 shows the invention 1 in an exploded view with the back of it, or knob 10 to the lower left and the chin 8 and jaws 7, 13 to the upper right. The invention 1 has its knob 10 that connects to the shaft 11. The shaft then enters a first chamber 17a that communicates to the chamber 17 inwardly in the body proximate the shoulder. Beneath the first chamber, the chest 4 has the aperture 4b here shown as rectangular that admits the strap 2 around a bar 4a. Inwardly from the bar, the body narrows upwardly in the neck 5 and then widens outwardly and is downwardly to the shoulder 6. The shoulder has the chamber 17 within it and then extends the cover 9 and the lower jaw 7 from it opposite the handle. The cover and the lower jaw have a generally parallel orientation. The lower jaw 7 tapers its thickness upwardly. Between the cover and the lower jaw, the body has a bore 12b transverse the longitudinal axis of the body or the length. The bore is recessed from the shoulder and admits the pin 12 into it. The recessed bore then receives two tabs 13a of the upper jaw 13. The two tabs have a rounded shape and widths less than the width of the upper jaw. The tabs have their own bores into which inserts the pin 12. Though the pin is described singularly, the Applicants foresee a two pin embodiment. The upper jaw has a generally rectangular form that fits beneath the cover and flush to all sides of the cover and lower jaw. The upper jaw has a depth that exceeds three times the length of the tabs. The upper jaw has a thickness that also is less than the diameter of the tabs. The upper jaw then moves upon the urging of the rod 16 operatively connected to the shaft 11 through the first chamber 17a and the chamber 17. Outwardly from the tabs, the upper jaw receives the upper tray 15 and above the chin 8, the lower jaw receives the lower tray 14. Both the upper tray 15 and the lower tray 14 have teeth 18 and alternatively lips 19 as previously described.

During an evacuation or other event using the invention, a user may not have lighting, such from a power failure or damage to a hospital. FIG. 10 shows a light housing 50 that receives the previously described invention 1. The housing includes a slot 51 of the similar or slightly greater width than the diameter of the knob 10. The slot receives the knob portion of the invention first and the trays 14, 15 of the jaws 7, 13 remain outwardly from the housing 50. The housing has a generally symmetric form with an upper surface 52 and a spaced below parallel lower surface 53. The upper surface and the lower surface connect through two mirror image gambrel like sides 54. Extending from the slot 51 to the sides 54, the housing has its two collinear fronts 55. Each front has at least one light, typically LED, as at 56. Inwardly from the slot 51 towards a back 57 as shown, the upper surface has an aperture 58 through the lower surface that admits the strap 2. The back, sides, and fronts have a height less than the diameter of the knob.

Figure 11:
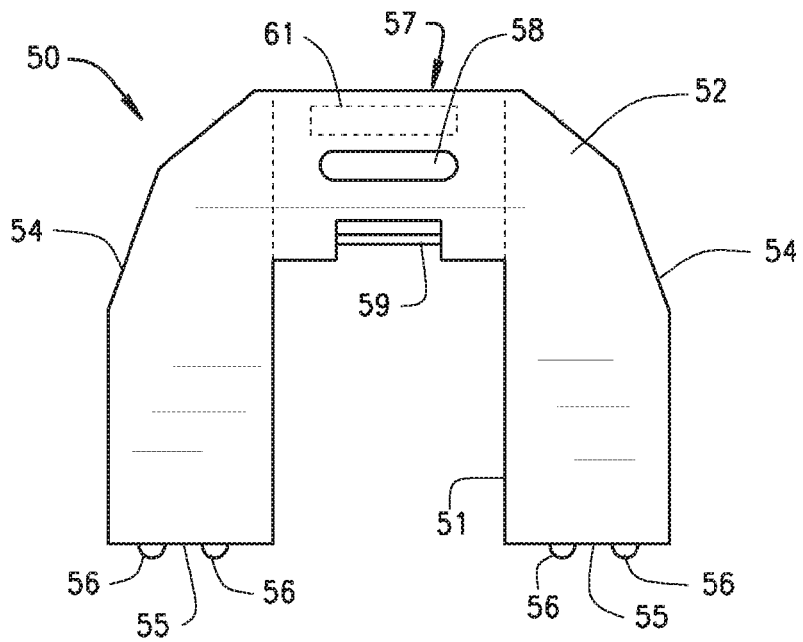
FIG. 11 is a top view.

FIG. 11 shows a top view of the housing 50 with the upper surface 52 in the foreground. The housing has one axis of symmetry through the center of the slot 51. The slot has a rectangular shape sized to accept the knob, chest, and a portion of the neck of the invention 1. Inwardly from the fronts 55, the slot has a bar 59 spaced across a recess. The bar accommodates the knob once inserted into the slot. Rearward from the bar, the upper surface has its aperture 58 with a width slightly less than that of the chest and a depth through the upper surface to the lower surface. Spaced outwardly from the slot, the housing has a gambrel like shape in this view on its sides. The sides 54 begin at the fronts 55 and extend parallel to the slot for a distance rearward and then transition inwardly at three positions where the three transitions complete a ninety change in orientation of the side. The sides then merge with the back 57 which is generally parallel to the fronts and perpendicular to the slot. Opposite the back, the housing has the two fronts 55 spaced about the slot and each front having at least one light.

Figure 12:
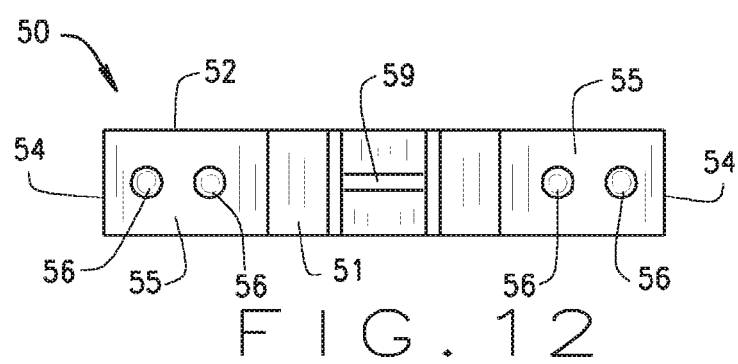
FIG. 12 is a front view.

Then FIG. 12 illustrates the housing from a front view, that is, as it accepts the invention 1 and illuminates a pillowtop grasped within the invention as earlier described in FIG. 1. The housing has a symmetric form in this view centered upon the slot 51. Into the plane of this figure, the slot steps inwardly in width and has the bar 59 generally centered in the thickness of the housing. Forward from the bar, the slot has its full width ready to accept the invention.

Outwardly left and right of the slot, the housing has the fronts 55 that have two lights 56 here shown. The lights have positions and orientations to illuminate an object or material grasped by the invention.

Figure 13:
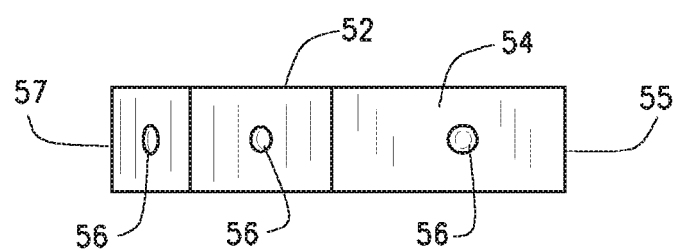
FIG. 13 is a side view.

FIG. 13 has the housing from a side view with a side 54 in the foreground. The side has the three transitions from the front at the right that then adjust the orientation of the housing to match that of the back 57.

Figure 14:
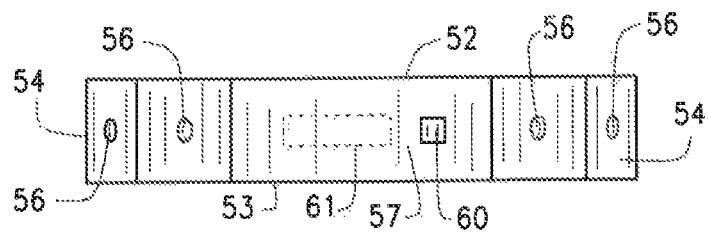
FIG. 14 is a back view of the light housing alternate embodiment; and,
FIG. 15 is a top view of the light housing alternate embodiment.

The back 57 appears in the foreground of FIG. 14. The back is generally parallel to the plane of this figure while the sides 54 extend into the plane of this figure using the transitions as described for a gambrel like shape shown in FIG. 11. Each side also includes at least one light, 56, preferably LED. The back also has a switch 60 the turns all of the lighting in the housing either on or off as selected by the user. Behind the switch 60 and inwardly from the back 57, the housing has a compartment for an onboard power supply, typically a gang of batteries 61 connected by wiring into a circuit with the lights 56 and the switch 60. The batteries have a suitable size for the thickness of the housing, such as AAA, AA, or 9V, or LR03, LR06, 6LR61 respectively.

Figure 15:
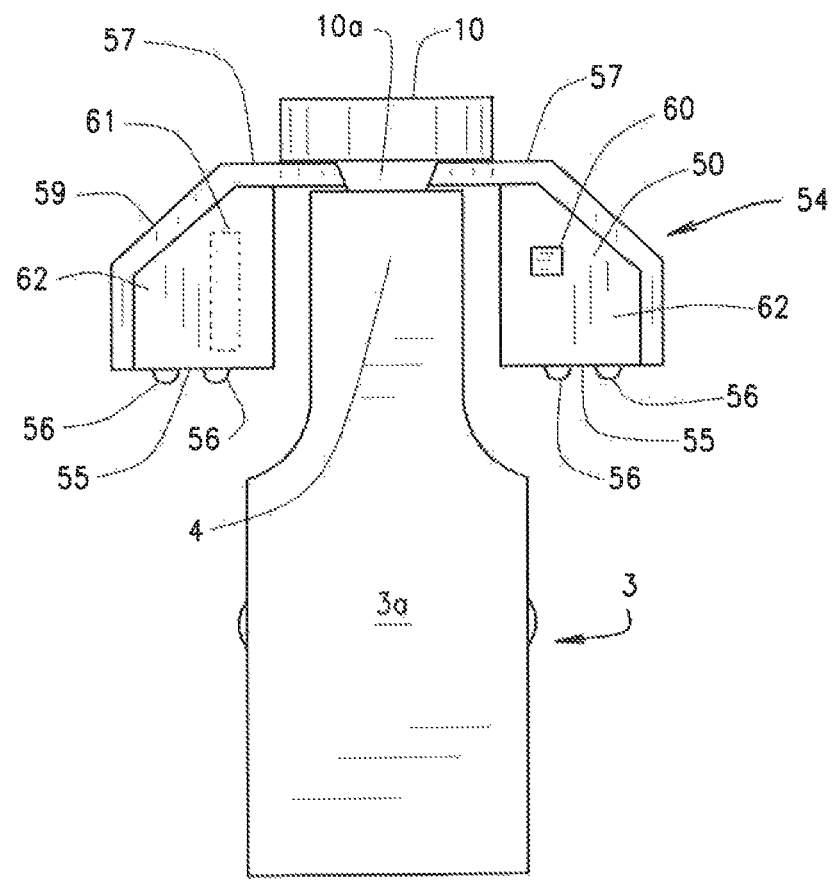

And FIG. 15 shows a further alternate embodiment of the invention particularly the housing 50. The knob 10 has its round shape and an inwardly beveled truncated conical base as at 10*a*. This housing 50 then fits upon the conical base in a self centering manner. The housing has a generally symmetrical form that may rotate upon the conical base. The is housing has two wings 62, coplanar, and symmetrically arranged upon a back 57. Each wing has a front 55, a gambrel like side 54 that transitions from the front to the back in two steps, and the back 57 that spans from one wing to the other. The back has an aperture centered in it that admits the conical base 10*a* as shown. Each wing also has an upper surface 52 and an opposite lower surface, not shown but generally of similar shape as the upper surface. Each front has at least one light 56, though two are shown here. On each wing the upper surface is spaced apart from the lower surface for a thickness allowing room for the lights, wiring, battery, and switch. One wing includes a compartment and the batteries in electrical communication to the lights of both wings and the switch in the other wing.

During an evacuation of a patient, such as before a tornado, other natural event, or a man made event, a user finds a patient upon a flexible sheet of material beneath the patient. Typically that flexible sheet, or pillowtop, extends lengthwise beneath the patient and has edges approximating four rectangular edges. A user then deploys at least three of the invention 1 upon the flexible sheet with two near the head of the patient and at least one near the feet of the patient. Each of the invention, or clamps, has a strap extending from it and suitable for grasping by a user. The user, or more likely a team of user, then engage each of the devices and turning the knobs, clamp the upper jaws upon the pillowtop. The user has to pause prior to engaging the device as the knob turns counterclockwise. With the at least three inventions engaged and clamped upon the pillowtop, the user, or team of users, lifts the straps and thus the patient for movement and transport from a location in danger to a safer location.

From the aforementioned description, an Evacu Zip and Carry Strap with Clamp has been described. The device of the an Evacu Zip and Carry Strap with Clamp is uniquely capable of rapidly gripping a pillowtop upon from a hospital bed and then supporting a patient placed within the pillowtop. The Evacu Zip and Carry Strap with Clamp may be made to integrate with an existing high impact, commercial strength polymer zipper for durable mattress grade with a reinforced one way non slip clamp. Additionally, the strap would utilize a woven durable nylon and cotton blend or durable neoprene that provides for comfortable gripping and strong load carrying capacity.

The Evacu Zip and Carry Strap with Clamp and its various components may be manufactured from many materials, including but not limited to, steel, aluminum, polymers, ferrous and non-ferrous metal foils, their alloys, and composites.

Various aspects of the illustrative embodiments have been described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations have been set forth in order to provide a thorough understanding of the illustrative embodiments. However, it will be apparent to one skilled in the art that the present invention may be practiced without the specific details. In other instances, well known features are omitted or simplified in order not to obscure the illustrative embodiments.

Various operations have been described as multiple discrete operations, in a manner that is most helpful in understanding the present is invention, however, the order of description should not be construed as to imply that these operations are necessarily order dependent. In particular, these operations need not be performed in the order of presentation.

Moreover, in the specification and the following claims, the terms "first," "second," "third" and the like—when they appear—are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to ascertain the nature of the technical disclosure. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

As such, those skilled in the art will appreciate that the conception, to upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

We claim:

1. A device to grip and then to release a material for usage as a stretcher during an emergency, said device to grip comprising:

a body, generally elongated and rectangular, said body having a chest, a neck extending from said chest, a shoulder extending from said neck, a cover extending from said shoulder opposite said chest, a lower jaw spaced beneath said cover, an upper jaw beneath said cover and pivotally connecting to said shoulder, said upper jaw and said lower jaw having an open position when mutually spaced apart and a closed position when mutually in contact;

said lower jaw having a chin opposite said shoulder and at least one tooth above said chin and said upper jaw having at least one tooth opposite said cover;

a knob joined to a shaft, said shaft turning within a chamber formed axially within said body through said chest, said neck and into said shoulder, said shaft operatively connecting to a rod, said rod engaging said upper jaw to open and to close it; and, wherein said knob turns counterclockwise to place said device in said closed position and turns clockwise to place said device in said open position.

2. The device to grip of claim 1 further comprising:
said knob having a greater width than said chest and said shoulder having a greater width than said neck and said knob.

3. The device to grip of claim 2 further comprising:
said knob having a beveled base engaging said chest during usage.

4. The device to grip of claim 1 further comprising:
said shaft turning counterclockwise and advancing said rod inwardly from said cover and against said upper jaw thus moving said upper jaw proximate said lower jaw, said device thus attaining said closed position.

5. The device to grip of claim 4 further comprising:
said upper jaw having a tray, said tray having a plurality of teeth in at least one row; and,
said lower jaw having a tray, said tray having a plurality of teeth in at least one row, said tray of said lower jaw aligning with said tray of said upper jaw wherein said pluralities of teeth are adapted to engage a material placed between them during usage.

6. The device to grip of claim 1 further comprising:
a housing adapted to receive said body therein, said housing including at least two lights oriented towards said lower jaw, a power supply in electrical communication to said at least two lights, and a switch in electrical communication to said at least two lights and said power supply.

7. The device to grip of claim 6 further comprising:
said housing having an elongated back and a centered aperture in said back, two spaced apart, coplanar, symmetric wings joined to said back and spaced outwardly from said centered aperture;
said knob having a greater width than said chest and a beveled base fitting into said centered aperture and then engaging said chest during usage; and,
said shoulder having a greater width than said neck and said knob.

8. The device to grip of claim 1 further comprising:
said neck having a thickness opposite said cover wherein said thickness is greatest proximate said chest and said shoulder and thinnest centered between said chest and said shoulder;
wherein said neck is adapted to receive the fingers of a user in a comfortable grip during usage of said device.

9. The device to grip of claim 1 further comprising:
a strap operatively connected to said body generally opposite said cover; and,
an aperture in said chest beneath said chamber, said aperture receiving said strap therein.

10. A device to form a stretcher from a flexible material, said device comprising:

an upper jaw, generally planar in shape;
a lower jaw spaced beneath said upper jaw;
a cover, outwardly from said upper jaw;
a shoulder rearward from said upper jaw, said cover and said lower jaw merging with said shoulder;
said upper jaw pivotally connecting to said shoulder upon at least one transverse pin through said shoulder, said upper jaw and said lower jaw having an open position when mutually spaced apart and a closed position when mutually in contact;
said lower jaw having a chin opposite said shoulder and at least one tooth above said chin and said upper jaw having at least one tooth opposite said cover;
a body extending rearward from said shoulder and said cover, said body forming a handle for said device, said handle being generally elongated and rectangular;
said body having a neck extending from said shoulder opposite said lower jaw, a chest merging from said neck opposite said shoulder, and said cover extending over said neck;
a knob joined to a shaft outwardly of said chest, said shaft turning within a chamber positioned axially within said body through said handle, said chest, said neck and into said shoulder, said shaft operatively connecting to a rod, said rod engaging said upper jaw to open and to close it; and,
wherein said knob turns counterclockwise to place said device in said closed position and turns clockwise to place said device in said open position.

11. The device to form a stretcher of claim 10 further comprising:
said knob having a greater width than said chest and said shoulder having a greater width than said neck and said knob.

12. The device to form a stretcher of claim 11 further comprising:
said knob having a beveled base engaging said chest during usage.

13. The device to form a stretcher of claim 12 further comprising:
said shaft turning counterclockwise and advancing said rod inwardly from said cover and against said upper jaw thus moving said upper jaw proximate said lower jaw, said device thus attaining said closed position;
said upper jaw having a tray, said tray having a plurality of teeth in at least one row; and,
said lower jaw having a tray, said tray having a plurality of teeth in at least one row, said tray of said lower jaw aligning with said tray of said upper jaw wherein said pluralities of teeth are adapted to engage a material placed between them during usage.

14. The device to form a stretcher of claim 13 further comprising:
said tray of said upper jaw having a lengthwise lip outwardly of said upper jaw and said plurality of teeth of said tray of said upper jaw locating inwardly of said lip; and,
said tray of said lower jaw having a lengthwise lip outwardly of said lower jaw and said plurality of teeth of said tray of said lower jaw locating inwardly of said lip.

15. The device to form a stretcher of claim 10 further comprising:
a housing adapted to receive said body therein, said housing including at least two lights oriented towards said lower jaw, a power supply in electrical communication to said at least two lights, and a switch in electrical communication to said at least two lights and said power supply.

16. The device to form a stretcher of claim 15 further comprising:
said housing having an elongated back and a centered aperture in said back, two spaced apart, coplanar, symmetric wings joined to said back and spaced outwardly from said centered aperture;
said knob having a greater width than said chest and a beveled base fitting into said centered aperture and then engaging said chest during usage; and,
said shoulder having a greater width than said neck and said knob;
wherein said centered aperture allows said housing to rotate upon said base.

17. The device to form a stretcher of claim 10 further comprising:
said neck having a thickness opposite said cover wherein said thickness is greatest proximate said chest and said shoulder and thinnest centered between said chest and said shoulder wherein said neck is adapted to receive the fingers of a user in a comfortable grip during usage of said device.

18. The device to form a stretcher of claim 1 further comprising:
a strap operatively connected to said body generally opposite said cover and an aperture in said chest beneath said chamber, said aperture receiving said strap therein.

19. The device to form a stretcher of claim 10 further comprising:
said handle including said chest and said neck.

* * * * *